Patented Jan. 5, 1937

2,066,778

UNITED STATES PATENT OFFICE 2,066,778

METHOD OF SETTLING INORGANIC MINERAL SLIMES

Abraham M. Herbsman, Huntington Park, Calif., assignor to Industrial Patents, Ltd., Los Angeles, Calif., a corporation of California No Drawing. Application March 27, 1934, Serial No. 717,594

2 Claims. (Cl. 209—5)

My invention relates to the art of ore dressing and particularly to recovery of the values in slimes.

In dressing ore, the grading of the ore below the fine limit of screening is accomplished generally by settling the fines in water. This method of classifying the finer particles of ore is quite efficient in performing its purpose. The very finest particles of ore or metal, however, do not settle out of the water but form a suspension in the water. This suspension is called "slime" and overflows from the classifier so that considerable quantities of it are produced as a regular by-product of the water settling of ores. In fact, such quantities of metallic and ore values are carried from the classifier in these slimes that some means for recovering these values must be used in order to prevent a substantial loss of efficiency in the entire ore dressing process. Heretofore huge multiple deck rotating slime tables have been in general use for recovering the slime values. These have been so expensive to build and operate, however, as to render prohibitive the recovery of values from slime in dressing poorer grade ores or the ores of the baser metals.

It is accordingly an object of my invention to provide a relatively inexpensive and efficient method of classifying fines and/or separating the values from slimes produced by the classifying step in ore dressing.

A further object is to provide such a method which is applicable to settling any of the slimes or suspensions produced in the ore dressing art.

Broadly, my method consists in mixing with the water either in the classifier or in the slime overflowing therefrom a relatively minute quantity, either alone or in admixture with a dilutent, of a sulphonated glyceride, a sulphonated fatty acid, a sulphonated mineral oil, a sulphonated napthenic acid, or an aromatic compound of one of the foregoing agents. I have found that when one of these treating agents to the amount of about ½% (one-half of one per cent) of the water in the classifier is added to this water so that it is thoroughly mixed therewith, the formation of slime is almost entirely eliminated and the values ordinarily remaining in suspension in the classifier settle out with the heavier values in the classifier.

I have also found that where a similar quantity of one of these treating agents is thoroughly mixed with the slime after this is discharged from the classifier, and the slime allowed to stand a few minutes, the values in the slime rapidly settle to the bottom leaving a clear layer of water thereabove. The slimes are preferably handled in batches by my method and after the stratification of the water and values in the slimes the clear water may be decanted and the values recovered.

My method is also applicable to preventing the formation of slimes and for recovering the values in slimes in connection with the leaching of metal particles or metallic compounds, such as silver, gold, mercury, lead, and compounds of the same from the rock in which they occur in nature. This leaching is usually effected by a solution of sodium cyanide or sodium thiosulphite and a similar problem is met with here in the formation of slimes or suspensions in the leaching solution, thus interfering with the precipitation of the precious metal itself or compounds thereof dissolved in said solution onto copper wire, according to any of the modes well known in the art.

In applying my method to the leaching of ores, a small quantity of one of the treating agents above mentioned is added to the leaching solution, this quantity being preferably about one-half of 1% of the volume of the solution and the leaching process then carried out. The presence of the treating agent of my invention in the leaching solution substantially prevents the formation of a suspension therein and results in the leaching solution, when withdrawn from the ore, clarifying rapidly in readiness for the precipitation of values therefrom. In some cases it is desirable that clarification of the leaching solution be reserved until after the leaching solution has been separated from the rock from which the values have been leached. In such a case the leaching solution is then treated in the same manner as above noted by the addition thereto and a thorough mixture therewith of a relatively small quantity of one of the treating agents of my invention. This causes a rapid clarification of the leaching solution by precipitation of all suspended matter therefrom, this leaving the solution ready for the step of precipitation of the values dissolved in the solution.

What I claim is:

1. In the art of recovering ore values from slime the method of breaking down said slime which consists in mixing with said slime a relatively small quantity of sulphonated glyceride, permitting said mixture to stratify, and separating the stratified phases of said slime.

2. In the art of recovering ore values from crushed ore the method which consists in washing said ore in water having a relatively small quantity of sulphonated glyceride mixed with said water, separating said water from the coarser portions of said ore, said water carrying with it said ore values washed by said water from said ore, and permitting said water to stand and the matter suspended therein to settle from said water.

ABRAHAM M. HERBSMAN.